United States Patent
Lee

(10) Patent No.: US 9,225,542 B2
(45) Date of Patent: Dec. 29, 2015

(54) METHOD AND APPARATUS FOR TRANSMITTING/RECEIVING CONTENT BY INTERCONNECTING INTERNET PROTOCOL TELEVISION WITH HOME NETWORK

(75) Inventor: Hyeon-jae Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 922 days.

(21) Appl. No.: 11/860,070

(22) Filed: Sep. 24, 2007

(65) Prior Publication Data

US 2008/0077703 A1 Mar. 27, 2008

Related U.S. Application Data

(60) Provisional application No. 60/846,357, filed on Sep. 22, 2006.

(30) Foreign Application Priority Data

Nov. 28, 2006 (KR) ........................ 10-2006-0118548

(51) Int. Cl.
*H04N 21/40* (2011.01)
*H04L 12/28* (2006.01)
(Continued)

(52) U.S. Cl.
CPC ........ *H04L 12/2821* (2013.01); *H04L 63/0428* (2013.01); *H04N 7/106* (2013.01); *H04N 7/17318* (2013.01); *H04N 21/4108* (2013.01); (Continued)

(58) Field of Classification Search
CPC .............. H04L 63/0428; H04L 63/061; H04L 65/4076; H04N 21/4108; H04N 21/43615

USPC .......................................................... 709/225
See application file for complete search history.

(56) References Cited

U.S. PATENT DOCUMENTS 6,865,555 B2   3/2005  Novak
7,382,334 B1 *  6/2008  Hylin et al. .................... 345/2.1
(Continued)

FOREIGN PATENT DOCUMENTS

CN            1697412 A      11/2005
KR    10-2002-0028230 A       4/2002
(Continued)

OTHER PUBLICATIONS

Marijan Leban, Internet Search for TV Content Based on TV Anytime, EUROCON 2003, Computer as a Tool, The IEEE Region 8, Sep. 22-24, 2003, pp. 70-73, vol. 2.
(Continued)

*Primary Examiner* — Aaron Strange
(74) *Attorney, Agent, or Firm* — Sughrue Mion, PLLC

(57) ABSTRACT

A method and apparatus for transmitting and/or receiving digital content through an Internet protocol (IP) network are provided. The method of receiving a digital content file from a content server by a device in a home network, includes: receiving access information of the digital content file from another device in the home network which is permitted to access the digital content file; directly requesting the content server to transmit the digital content file, based on the received information; and receiving the digital content directly from the content server. In this way, an overload that can occur in a device relaying digital content, as the device relays digital content to a plurality of devices on a home network, can be prevented.

22 Claims, 5 Drawing Sheets

(51) Int. Cl.
| | |
|---|---|
| *H04L 29/06* | (2006.01) |
| *H04N 7/10* | (2006.01) |
| *H04N 7/173* | (2011.01) |
| *H04N 21/41* | (2011.01) |
| *H04N 21/436* | (2011.01) |
| *H04N 21/4405* | (2011.01) |
| *H04N 21/442* | (2011.01) |
| *H04N 21/482* | (2011.01) |
| *H04N 21/643* | (2011.01) |
| *H04N 21/658* | (2011.01) |
| *H04N 5/44* | (2011.01) |
| *H04N 21/462* | (2011.01) |

(52) U.S. Cl.
CPC ..... *H04N 21/43615* (2013.01); *H04N 21/4405* (2013.01); *H04N 21/44231* (2013.01); *H04N 21/482* (2013.01); *H04N 21/64322* (2013.01); *H04N 21/6581* (2013.01); H04L 65/4076 (2013.01); H04L 2463/101 (2013.01); H04N 5/4401 (2013.01); H04N 21/4622 (2013.01)

(56) References Cited

U.S. PATENT DOCUMENTS

| | | | |
|---|---|---|---|
| 2002/0034179 A1 | 3/2002 | Ollikainen et al. | |
| 2002/0035730 A1 | 3/2002 | Ollikainen et al. | |
| 2002/0116471 A1 | 8/2002 | Shteyn | |
| 2003/0070181 A1 | 4/2003 | Holm | |
| 2003/0097655 A1 | 5/2003 | Novak | |
| 2003/0126086 A1 | 7/2003 | Safadi | |
| 2003/0145085 A1* | 7/2003 | Baldwin et al. | 709/225 |
| 2004/0181811 A1 | 9/2004 | Rakib | |
| 2005/0138193 A1 | 6/2005 | Encarnacion et al. | |
| 2005/0169473 A1 | 8/2005 | Candelore | |
| 2005/0228858 A1* | 10/2005 | Mizutani et al. | 709/201 |
| 2005/0254524 A1 | 11/2005 | An | |
| 2006/0069645 A1 | 3/2006 | Chen et al. | |
| 2006/0088299 A1 | 4/2006 | Ikeda | |
| 2006/0112074 A1* | 5/2006 | Han | 707/2 |
| 2007/0078987 A1* | 4/2007 | Walker et al. | 709/227 |

FOREIGN PATENT DOCUMENTS

| | | |
|---|---|---|
| KR | 10-2002-0033175 A | 5/2002 |
| KR | 10-2003-0055713 A | 7/2003 |
| KR | 10-2005-0060945 A | 6/2005 |
| KR | 10-2006-0060237 A | 6/2006 |
| KR | 10-2006-0063376 A | 6/2006 |
| KR | 10-2006-0070299 A | 6/2006 |
| WO | WO 01/18725 A1 | 3/2001 |
| WO | WO 01/19074 A1 | 3/2001 |
| WO | WO 03/030549 A1 | 4/2003 |
| WO | WO 2004/084445 A3 | 9/2004 |
| WO | WO 2005/079213 A3 | 9/2005 |

OTHER PUBLICATIONS

Communication, dated Sep. 21, 2012, issued by the European Patent Office in counterpart European Patent Application No. 07808404.3.
Communication, dated Oct. 4, 2012, issued by the European Patent Office in counterpart European Patent Application No. 07808404.3.
Communication dated Jan. 19, 2012, issued by the Korean Intellectual Property Office in counterpart Korean Application No. 10-2007-0075872.
Communication dated Nov. 24, 2011, issued by the State Intellectual Property Office of P.R. China in counterpart Chinese Application No. 200780034993.2.
Office Action from the State Intellectual Property Office of P.R. China dated Apr. 25, 2011 in counterpart application No. 200780034993.2.

* cited by examiner

METHOD AND APPARATUS FOR TRANSMITTING/RECEIVING CONTENT BY INTERCONNECTING INTERNET PROTOCOL TELEVISION WITH HOME NETWORK

CROSS-REFERENCE TO RELATED PATENT APPLICATIONS

This application claims priority from U.S. Provisional Application No. 60/846,357, filed on Sep. 22, 2006, in the U.S. Patent and Trademark Office, and Korean Patent Application No. 10-2006-0118548, filed on Nov. 28, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to transmitting and/or receiving digital content, and more particularly, to a device on a home network which uses digital content provided from a content server.

2. Description of the Related Art

With rapid development of wired and wireless communication technologies based on transmission control protocol/Internet protocol (TCP/IP), transmission and reception of digital content through TCP/IP wired and wireless networks have been increasingly performed. Since the transmission and reception of digital content through wired and wireless networks are performed between two devices separated a remote distance from each other, the communication is exposed to a security risk. A security risk, in terms of a device unauthorized to transmit or receive digital content, such as hacking or eavesdropping, always exists. Since the content transmitted and received through wired and wireless networks is digital, and thus is easily copied, this security risk is more critical to the copyright management of the digital content.

One security method used to handle this security risk is a conditional access system (CAS). The CAS is a system giving authority to access fee-paying digital content, or restricting access to the digital content. The digital content, which a content server encrypts and transmits, can be decrypted by using an encryption key only when a reception device has a right to access digital content. By allowing the reception device to use the content only when the reception device is permitted to access the content by paying the fee to use the content, unauthorized duplication of the digital content is prevented. A method of transmitting and receiving digital content by using the CAS will now be explained in relation to an example of an Internet protocol television (IPTV).

FIG. 1 is a diagram illustrating a conventional method of transmitting and receiving digital content. FIG. 1 illustrates the method which has been recently suggested in order for a plurality of devices in a home network to transmit and receive digital content provided through an IPTV network.

Referring to FIG. 1, an IPTV set-top box 12 receives digital content and information on the content provided by a content server 11, converts the content into a form that can be provided through a home network, and transmits the converted content to TV 1 13 through TV 3 15. The information on the content may include metadata, electronic program guide (EPG) information, and video on demand (VOD) list information of the content.

The IPTV set-top box 12 which receives the content and information on the content from the content server 11, first, converts the information on the content into a form that can be provided through the home network, and discloses the converted information to TV 1 13 through TV 3 15. For example, according to a method of updating the list of a content directory service (CDS) of a universal plug and play (UPnP) network based on the information on the received convent, the information on the content can be disclosed to devices in the home network.

TV 1 13 through TV 3 15 request the IPTV set-top box 12 to transmit predetermined digital content based on the information on the content. The IPTV set-top box 12 requests the content server 11 to provide the content requested by TV 1 13 through TV 3 15, and receives the content encrypted with a predetermined encryption key. Since the content server 11 and the IPTV set-top box 12 control access by using the CAS, only the IPTV set-top box 12 can decrypt the content transmitted by the content server 11, by using the key used for the encryption. Both symmetric keys and asymmetric keys can be used as the encryption key.

The IPTV set-top box 12 decrypts the received content, and transmits the content to TV 1 13 through TV 3 15. When the IPTV set-top box 12 relays the received content to TV 1 13 through TV 3 15, the IPTV set-top box 12 encrypts the content received from the content server 11, with a predetermined encryption key, and transmits the content. Even in the home network formed with the IPTV set-top box 12 and the TVs, it is necessary to restrict access to the content by devices that do not have a right to receive the content. Accordingly, the IPTV set-top box 12 encrypts the content by using the encryption key and transmits the encrypted content.

When the IPTV set-top box 12 encrypts the content, a security method used when the content is transmitted and received in the home network is used. Accordingly, in the home network, a method unique to the network is used to register and/or authenticate a device at the other end, and the encrypted content is transmitted to only registered and authenticated devices. The encryption key used in the home network is different from the encryption key used by the content server when the content is encrypted, and the method of exchanging and managing the encryption key is also different to the method used by the content server 11.

When the IPTV set-top box 12 transmits the content to one device, that is, one of TV 1 13 through TV 3 15, the content is transmitted according to the method described above. However, when the IPTV set-top box 12 transmits the content to a plurality of devices from among TV 1 13 through TV 3 15 at the same time, an overload may occur in the IPTV set-top box 12.

As described above, the IPTV set-top box 12 decrypts the content transmitted by the content server 11, encrypts the content again and transmits the content to a device in the home network. In this case, for the encryption and decryption, a data encryption standard (DES), an advancement encryption standard (AES), or a T-DES that is a standardized symmetric key method is used. The low-priced IPTV set-top box 12 that is provided as a hardware module for encryption and decryption can perform encryption and decryption of only one digital content file at a time. That is, when the content to be provided to TV 1 13 is decrypted and encrypted, another content file cannot be transmitted to TV 2 14 or TV 3 15.

Accordingly, a method of embedding an IPTV set-top box 12 in each of the devices 13 through 15 on the home network can be considered. However, in this case, all the devices become set-top boxes, which is not efficient in terms of cost.

Also, in order to manage copyrights of IPTV content files more effectively, a predetermined copy protection technology should be applied to the IPTV set-top box 12 and the devices 13 through 15 in the home network. This increases complexity of the devices 13 through 15 on the home network and increases manufacturing costs.

Accordingly, a method capable of guaranteeing security of transmission and reception of digital content and efficiently relaying digital content is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a method and apparatus for transmitting and receiving digital content, and a computer readable recording medium having embodied thereon a computer program for executing the method.

According to an aspect of the present invention, there is provided a method of receiving a digital content file from a content server by a device on a home network, the method including: receiving access information of the digital content file from another device in the home network which is permitted to access the digital content file; and requesting the content server to transmit the digital content file, based on the received information.

The access information of the digital content file may be at least one of a uniform resource locator (URL) of the digital content file and information on an encryption key required for decrypting the digital content file.

The receiving of the access information includes: receiving information on the digital content files provided by the content server, from the other device; based on the received information, requesting the other device to provide the access information on the predetermined digital content file from among the digital content files; and receiving from the other device the access information as a response to the request.

According to another aspect of the present invention, there is provided a method of relaying a digital content file through a home network by a device which is permitted to access digital content files provided by a content server, the method including: receiving from the content server, access information on the digital content files provided by the content server; and transmitting access information on a predetermined digital content file from among the digital content files, to another device in the home network.

The transmitting of the access information on the predetermined digital content file includes: transmitting the received information on the digital content files provided by the content server, to the other device; receiving a request by the other device to transmit the access information of the predetermined digital content file from among the digital content files, based on the transmitted information; and transmitting the access information to the other device as a response to the request.

According to another aspect of the present invention, there is provided an apparatus for receiving a digital content file from a content server outside a home network by a device on the home network, the apparatus including: an information reception unit which receives access information of the digital content file from another device in the home network; and a content request unit which requests the content server to transmit the digital content file, based on the received information.

The information reception unit may include: a content information reception unit which receives information on the digital content files provided by the content server, from the other device; a request transmission unit, based on the received information, which requests the other device to provide the access information on the predetermined digital content file among the digital content file; and an access information reception unit which receives from the other device the access information as a response to the request.

According to another aspect of the present invention, there is provided an apparatus for relaying a digital content file through a home network by a device which is permitted to access digital content files provided by a content server, the apparatus including: a content information management unit which receives from the content server, access information on the digital content files provided by the content server; and an information transmission unit which transmits access information on a predetermined digital content file from among the digital content files, to another device on the home network.

The information transmission unit may include: a content information transmission unit which transmits the received information on the digital content files provided by the content server, to the other device; a request reception unit which receives a request by the other device to transmit the access information of the predetermined digital content file from among the digital content files, based on the transmitted information; and an access information transmission unit which transmits the access information to the other device as a response to the request.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
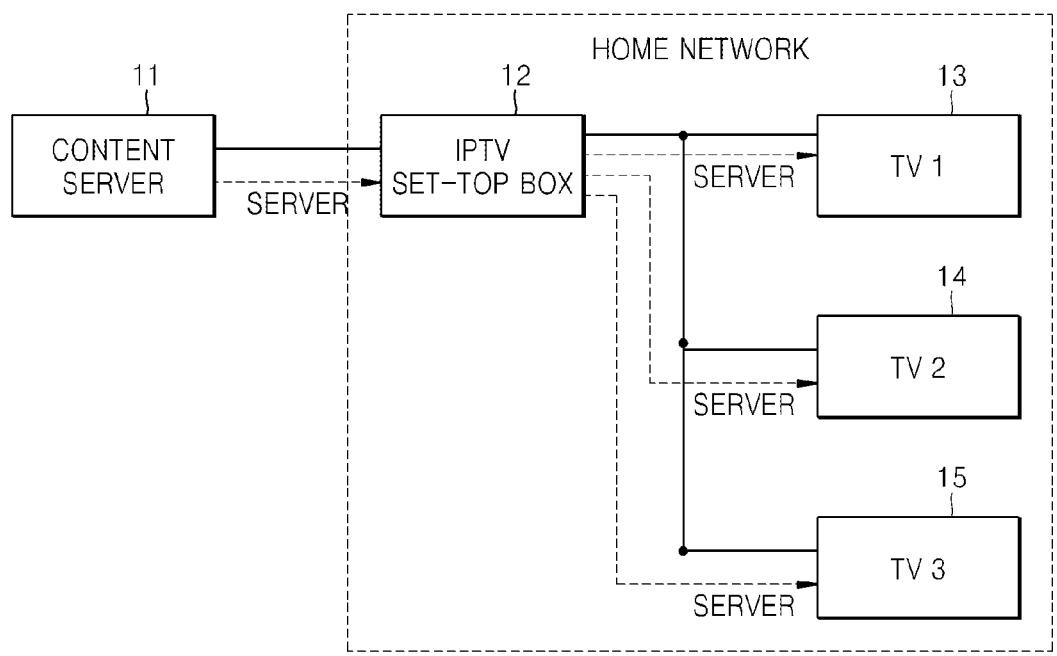
FIG. 1 is a diagram illustrating a conventional method of transmitting and receiving a digital content file.
Figure 2:
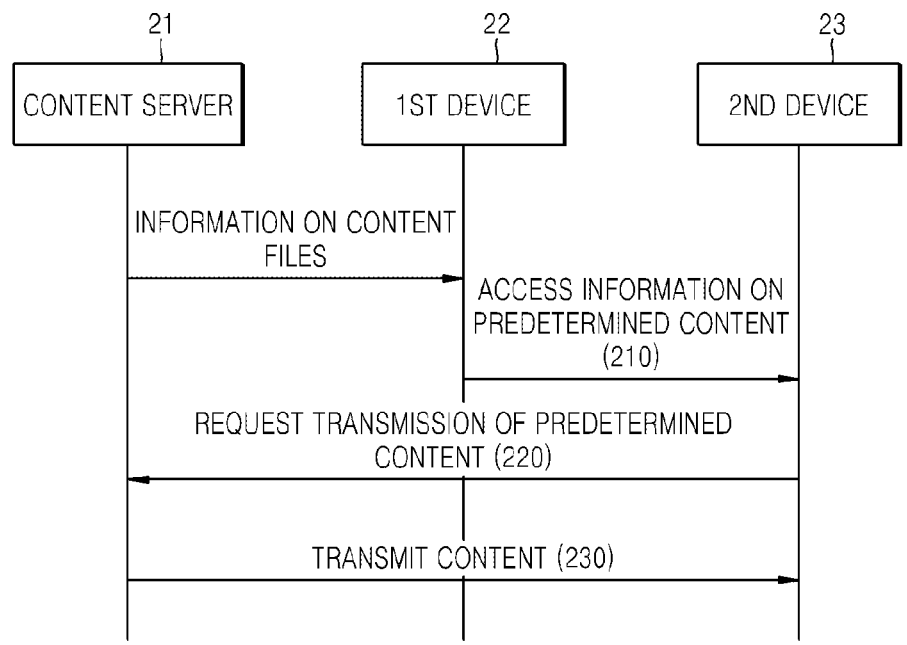
FIG. 2 is a data flow diagram illustrating a method of transmitting and receiving a digital content file according to an exemplary embodiment of the present invention.

FIG. 2 is a data flow diagram illustrating a method of transmitting and receiving a digital content file according to an exemplary embodiment of the present invention. According to the method illustrated in FIG. 2, a first device 22 which is permitted to access the digital content of a content server 21 relays the digital content, and a second device 23 uses the content relayed by the first device 22.

Referring to FIG. 2, the content server 21 is a server operated by a content provider who provides the digital content, and the first device 22 is a device which is permitted to access the digital content files provided by the content server 21. The content server 21 and the first device 22 each have an embedded conditional access system (CAS) module, thereby controlling access to the content. The content server 21 is an Internet protocol television (IPTV) content server providing the digital content through an IPTV network. The first device 22 may be an IPTV set-top box receiving the IPTV content from the content sever 21, or a digital television (DTV) with an embedded IPTV reception function.

The second device 23 is a device which forms, together with the first device 22, a home network, and communicates with the first device 22 through the home network. The second device 23 may be a media player forming the home network together with the first device 22, which is usually a DTV. It is assumed that the second device 23 is registered and/or authenticated by the first device 22 through a predetermined process in the home network.

In operation 200, the content server 21 transmits to the first device 22 information on digital content files of the content server 21. The information includes information on an electronic program guide (EPG) and/or video on demand (VOD) lists of the digital content files. The content server 21 transmits to the first device 22 information on all of the digital content files that can be provided through the first device 22.

In operation 210, the first device 22 transmits access information on predetermined digital content files to the second device 23. By referring to the information on the digital content files received in operation 200, the first device 22 transmits the access information of digital content files that are desired to be reproduced to the second device 23.

The access information may include a uniform resource locator (URL) of a digital content file stored in the content server 21 and/or an encryption key required for decrypting the digital content file.

A device which is permitted to access digital content files in the home network is the first device 22. However, according to an exemplary embodiment of the present invention, the second device 23 that is another device in the home network can also receive information on the URL and encryption key of the digital content, and directly request the content server 21 to provide the digital content.

The URL information is required by the second device 23 to directly request the content server to provide the digital content, and the information on the encryption key is information required by decrypting the digital content encrypted and transmitted by the content server 21.

In general, since devices of the home network also follow a process for registering and/or authenticating each other in a process of establishing a home network, it can also be guaranteed that the second device 23 is also a device used by a user who is permitted to use the digital content. Accordingly, even though the URL and encryption key that are used to restrict usage of the digital content are transmitted to the second device 23, the digital content cannot be used by an unauthenticated user.

In operation 220, the second device 23 directly requests the content server 21 to transmit predetermined digital content.

As a result, the user who is permitted to use the digital content through the first device 22 directly receives the digital content of the content server through the second device 23 that is a device other than the first device 22 in the home network.

In operation 230, the content server 21 transmits the digital content to the second device 23.

Only information on the digital content files, that is, the EPG and/or VOD list information, is transmitted to the first device 22 and the digital content is directly transmitted to the second device 23. When digital content is provided, the transmission is not performed through the first device 22, thereby preventing an overload that can occur when the first device 22 provides digital content to a plurality of home network devices at the same time.

Also, digital content is transmitted to the second device 23 which receives the access information of the digital content, by the first device 22 which is permitted to access the digital content, thereby preventing reception of the digital content by a user who is not permitted to use the digital content.

Figure 3:
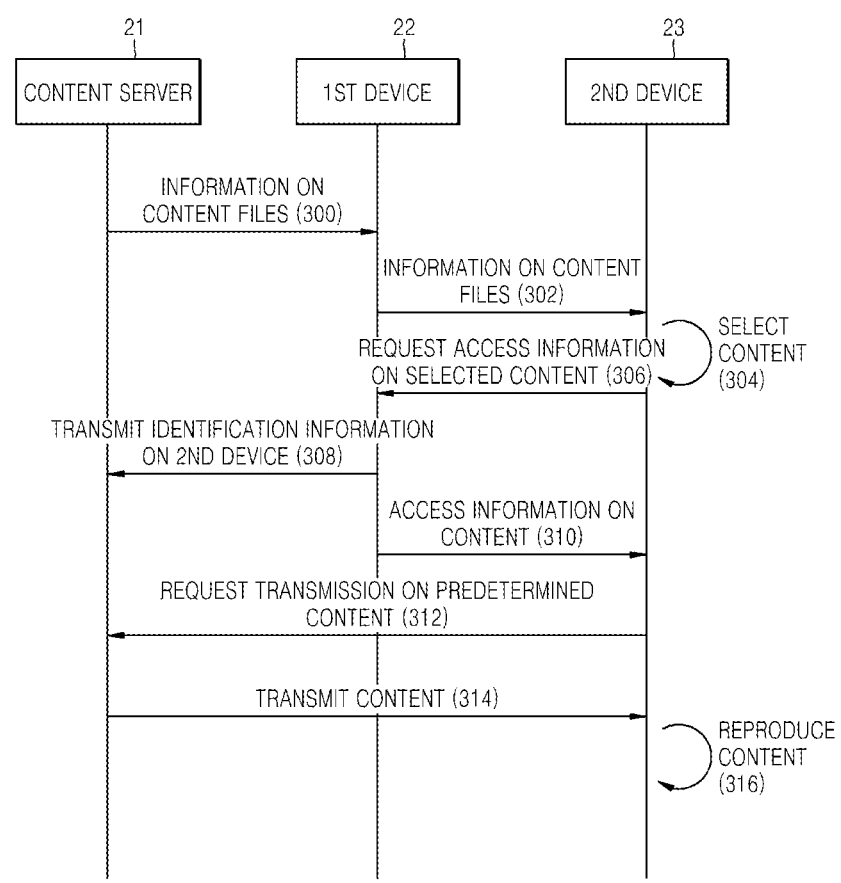
FIG. 3 is a data flow diagram illustrating a method of transmitting and receiving a digital content file according to another exemplary embodiment of the present invention.

FIG. 3 is a data flow diagram illustrating a method of transmitting and receiving a digital content file according to another exemplary embodiment of the present invention.

Referring to FIG. 3, as in FIG. 2, a content server 21 is a server operated by a content provider providing digital content files, and a first device 22 is a device which is permitted to access the digital content files provided by the content server 21. A second device 23 is a device forming a home network, together with the first device 22, and communicates with the first device 22 through the home network.

In operation 300, the content server 21 transmits to the first device 22 information on the digital content files of the content server 21. The EPG and/or VOD list information of the digital content files is transmitted to the first device 22. This operation is the same as operation 200 illustrated in FIG. 2.

In operation 302, the first device 22 transmits the information on the digital content received from the content server 21, to the second device 23.

The first device 22 transmits the EPG and/or VOD list information of the digital content files received from the content server 21 in operation 300, to the second device. The first device 22 transmits the information on the digital content files to the second device 23 so that a user can select a predetermined content file from among the digital content files provided by the content server 21, through the second device 23.

In operation 300, the first device 22 receives the information on the digital content files expressed according to a standard of a network (for example, an IPTV network) preset with the content server 21. Accordingly, when the received information is transmitted to the second device 23, the information should be transmitted after being converted into a form that can be understood by the second device 23 that is a home network device.

For example, it is assumed that the content server 21 is an IPTV content server, and the first device 22 is an IPTV set-top box, and at the same time, a device of a UPnP home network. First, the first device 22 receives the information on the digital content files from the content server 21 according to the predetermined protocol of the IPTV network. Then, based on the received information, a UPnP CDS list is updated and the information on the digital content files are provided to devices on the home network.

In addition, the first device 22 may include the information on the digital content files in a remote user interface (RUI) which is provided to the second device 23, thereby providing the information to the second device 23. There is no limit in the types of RUI, and an RUI based on a hypertext markup language (HTML) or a remote desktop protocol (RDP) may be used.

In operation 304, the user of the second device 23 selects a predetermined digital content file, by referring to the information on the digital content files received in operation 302. The user selects the digital content file to be reproduced in the second device 23, based on the EPG and/or VOD list information received from the first device 22 in operation 302. If the information on the digital content files is provided through the RUI in operation 302, a predetermined digital content file is selected from among the digital content files displayed in the RUI.

In operation 306, the second device 23 requests the first device 22 to provide access information on the predetermined digital content file. The access information on the digital content file that is selected by the user in operation 304 to be reproduced in the second device 23 is requested.

The access information requested by the second device 23 may include the URL of the digital content file that the content server 21 has, and/or an encryption key required for decrypting the digital content file as described above with reference to FIG. 2.

When the second device 23 requests the access information of the digital content, the second device 23 may also include information required for identifying the second device 23, into a message requesting the access information, and transmit the message to the first device 22. The device, which is permitted to access the digital content of the content server 21 in the home network, is the first device 22. Accordingly, in order for the second device 23 to receive the access information from the first device 22 and to directly request the digital content from the content server 21 according to the current exemplary embodiment of the present invention, information for the content server 21 to confirm whether or not the second device 23 has a right to request the digital content is required.

Accordingly, the information for identifying the second device 23 is received by the first device 22 from the second device 23, and the received information is transmitted to the content server 21 in operation 308.

There is no limit to the information for identifying the second device 23, and the information for identifying the second device 23 may include at least one of an IP address, a media access control (MAC) address, a global unique identifier (GUID), a personal identification number (PIN) code, and a subscriber identification of the second device 23. Information for managing a device, such as information on a TV software version, DTV maker information, and a serial number, may be included in the information for identifying the second device 23.

In operation 308, the first device 22 transmits the identification information of the second device 23 included in the request for the access information in operation 306, to the content server 21. The second device 23 may transmit a message after including the information for identifying the second device 23 in the message requesting the access information in operation 306, as described above with reference to operation 306.

Accordingly, in order for the content server 21 to control access to the digital content by utilizing the identification information of the second device 23, the first device 22 transmits the identification information of the second device 23 received in operation 306, to the content server 21.

In operation 310, the first device 22 transmits the access information of the predetermined digital content to the second device 23 according to the request for the access information in operation 306. The URL and/or encryption key of the digital content may be included in the access information, as described above.

Operations 308 and 310 are performed by the first device 22, and can be performed in reverse order or at the same time, which can be easily understood by a person of ordinary skill in the art pertaining to the exemplary embodiments of the present invention.

In operation 312, the second device 23 requests the predetermined digital content from the content server 21 according to the access information received in operation 310. According to the URL information of the digital content included in the access information in operation 310, the second device 23 directly requests the content server 21 to transmit the digital content.

In operation 314, the content server 21 transmits the digital content to the second device 23 according to the content transmission request of operation 312. By referring to the identification information of the second device 23 received in operation 308, it is determined whether or not the second device 23 requesting transmission of the digital content in operation 312 is a device having a right to access the digital content. According to the determination result, the requested digital content is transmitted to the second device 23.

In operation 316, the second device 23 reproduces the digital content received in operation 314. If the digital content is encrypted by a predetermined encryption key and transmitted, the digital content is decrypted by using the encryption key included in the access information received from the first device 22 in operation 310, and then reproduced.

Figure 4:
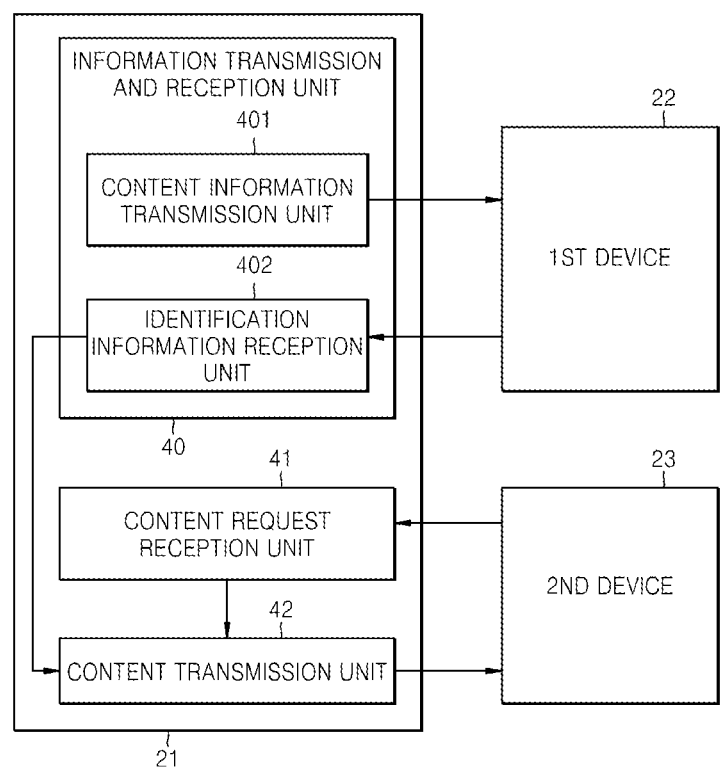
FIG. 4 is a diagram illustrating an apparatus for transmitting a digital content file in a content server according to an exemplary embodiment of the present invention.

FIG. 4 is a diagram illustrating an apparatus for transmitting a digital content file in a content server according to an exemplary embodiment of the present invention.

Referring to FIG. 4, a content server 21 is a server operated by a content provider providing digital content files. A first device 22 is a device which is permitted to access the digital content files provided by the content server 21. The first device 22 converts content information received from the content server 21 into content information of a home network, and provides the converted content information to a second device 23. According to a request from the second device, the first device 22 transmits the URL and encryption key of a digital content file so that the second device 23 can directly receive the digital content file from the content server 21. The second device 23 is a device that forms the home network, together with the first device 22, and communicates with the first device 22 through the home network.

Referring to FIG. 4, the apparatus for transmitting a digital content file of the content server 21 according to the current exemplary embodiment is composed of an information transmission and reception unit 40, a content request reception unit 41 and a content transmission unit 42.

The information transmission and reception unit 40 transmits information on digital content files that the content server 21 has, to the first device 22. According to another exemplary embodiment of the present invention, the information transmission and reception unit 40 includes a content information transmission unit 401 and an identification information reception unit 402.

The content information transmission unit 401 transmits information on the digital content files to the first device 22. Information on the digital content files, such as EPG and/or VOD list information, is transmitted to the first device 22.

The identification information reception unit 402 receives the identification information of the second device 23, transmitted by the first device 22. At least one of the IP address, MAC address and GUID of the second device 23 may be included in the identification information of the second device 23.

The content request reception unit 41 receives a request from the second device 23 to provide a digital content file. The second device 23 receiving the access information of the digital content file from the first device 22 directly requests the digital content file from the content server 21 and the content request reception unit 41 receives this content request message.

The content transmission unit 42 transmits the digital content requested by the second device 23. As the request from the second device 23 to transmit the digital content is received through the content request reception unit 41, the requested digital content is transmitted to the second device 23. At this time, according to another exemplary embodiment of the present invention, by referring to the identification information of the second device 23 received by the identification information reception unit 402, it may be confirmed that the device requesting the digital content is the second device 23, and then, the digital content may be transmitted.

Figure 5:
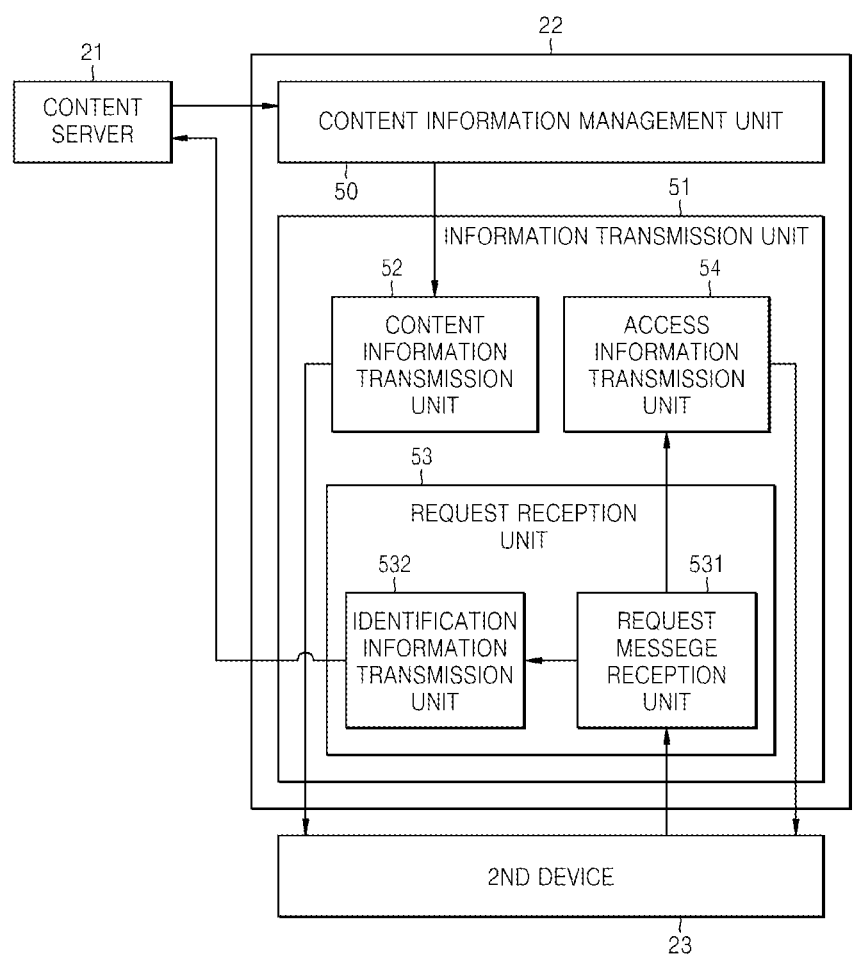
FIG. 5 is a diagram illustrating an apparatus for relaying a digital content file of a home network device according to an exemplary embodiment of the present invention.

FIG. 5 is a diagram illustrating an apparatus for relaying a digital content file according to an exemplary embodiment of the present invention.

Referring to FIG. 5, the apparatus for relaying a digital content file of a first device 22 includes a content information management unit 50 and an information transmission unit 51.

The content information management unit 50 receives information on digital content files transmitted by a content server 21. Examples of the information on the digital content files include EPG and/or VOD list information. Also, the content information management unit 50 converts the information on the digital content files received from the content server 21, into a form appropriate for the home network in order to transmit the information to a second device 23 through the home network.

The information transmission unit 51 transmits access information on a predetermined digital content file to the second device 23, by referring to the information on the digital content files received by the content information management unit 50. In this case, the predetermined digital content file is a digital content file that is desired to be reproduced in the second device 23. According to another exemplary embodiment of the present invention, the information transmission unit 51 may include a content information transmission unit 52, a request reception unit 53, and an access information transmission unit 54. Also, the request reception unit 53 may include an identification information transmission unit 531 and a request message reception unit 532.

The content information transmission unit 52 transmits to the second device 23 the information on the digital content files, which is received by the content information management unit 50 and is converted in order to be transmitted through the home network. The EPG and/or VOD list information of the digital content files may be included in an RUI and the RUI may be transmitted to the second device 23.

The request reception unit 53 receives a request by the second device 23 to provide access information on a predetermined digital content file. If a user of the second device 23 selects a predetermined digital content file by using the information on the digital content files provided through the content information transmission unit 52, the second device 23 requests the request reception unit 53 to provide the access information on the selected digital content file, in order to obtain the access information.

The request message reception unit 531 receives a message requesting the access information including information for identifying the second device 23. The information for identifying the second device 23 includes information such as the IP address, MAC address, and GUID, as described above.

The identification information transmission unit 532 transmits to the content server 21 the identification information of the second device 23, which is included in the message requesting the access information received by the request message reception unit 531. The identification information of the second device 23 is transmitted to the content server 21 so that when the content server 21 transmits a digital content file, the content server 21 can confirm that the device requesting transmission of the digital content is the second device 23 and then, can transmit the digital content.

The access information transmission unit 54 transmits to the second device 23 the requested access information on the predetermined digital content file according to the access information request received by the request reception unit 53. The access information may include a URL and/or information on an encryption key of the requested digital content file.

Figure 6:
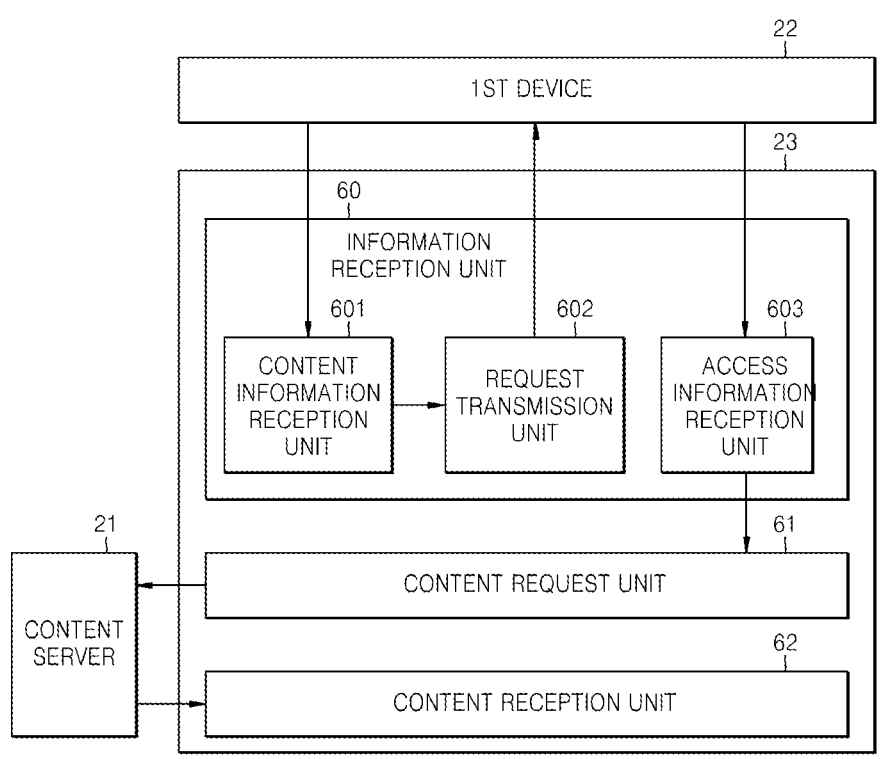
FIG. 6 is a diagram illustrating an apparatus for receiving a digital content file of a home network device according to an exemplary embodiment of the present invention.

FIG. 6 is a diagram illustrating an apparatus for receiving a digital content file according to an exemplary embodiment of the present invention.

Referring to FIG. 6, the apparatus for receiving a digital content file of a second device 23 according to the current exemplary embodiment includes an information reception unit 60, a content request unit 61, and a content reception unit 62.

The information reception unit 60 receives access information on a predetermined digital content file from a first device 22. The access information may include a URL and/or information on an encryption key of the digital content file.

According to another exemplary embodiment of the present invention, the information reception unit 60 may include a content information reception unit 601, a request transmission unit 602, and an access information reception unit 603.

The content information reception unit 601 receives from the first device 22, information on digital content files provided by a content server 21. The first device 22 receives information on digital content files, such as EPG and/or VOD list information, from the content server 21, and if the first device 22 converts the information in order to provide the information to a home network, and transmits the converted information, the content information reception unit 601 receives this information on the digital content files.

Based on the information on the digital content files received by the content information reception unit 601, the request transmission unit 602 requests the first device 22 to provide access information on a predetermined digital content file.

When the user of the second device 23 selects a predetermined digital content file, the first device 22 is requested to provide the access information of the selected digital content file.

Information for identifying the second device 23 is included in a message requesting the access information and then, the message is transmitted to the first device 22. Here, the identification information of the second device 23 may be information such as the IP address, MAC address and GUID of the second device 23, as described above.

The access information reception unit 603 receives the access information on the predetermined digital content file transmitted by the first device 22 in response to the request of the request transmission unit 602.

The content request unit 61 requests the content server 21 to provide the digital content based on the access information of the predetermined digital content received by the information reception unit 60. The content request unit 61 requests the digital content based on the URL information of the digital content included in the access information.

The content reception unit q97403 receives the digital content file provided by the content server 21 according to the request to provide the digital content.

According to an exemplary embodiment of the present invention as described above, the apparatus for reproducing a digital content file can directly request a content server to provide the digital content and receive the digital content, thereby reducing an overload that can occur in an apparatus for relaying digital content files.

Also, according to an exemplary embodiment of the present invention, a device in a home network including a device which is permitted to access digital content files can access a digital content file, thereby allowing efficient use of the digital content.

Furthermore, since digital content files used by home devices can be directly managed and provided by a content server, it is not necessary to apply copy protection technology for managing copyrights of a digital content file in a home network, to a home network. Accordingly, the complexity of home network devices can be reduced and manufacturing costs can be lowered.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope should be construed as being included in the present invention.

What is claimed is:

1. A method, performed by a second device in a network, for receiving a digital content file from a content server that is outside the network, the method comprising:
    receiving access information of the digital content file stored in the content server from a first device in the network permitted to access the digital content file;
    requesting the content server to transmit the digital content file, based on the access information; and
    receiving the requested digital content file directly from the content server and reproducing the received digital content file based on the access information,
    wherein the access information of the digital content file includes location of the digital content file and information on an encryption key for decrypting the digital content file,
    wherein the receiving access information of the digital content file further comprises transmitting information for identifying the second device, to the content server, through the first device,
    wherein the first device comprises a set-top box and the second device comprises a television within the home network, and
    wherein the receiving the requested digital content file comprises the television receiving the requested digital content file directly from the content server and not from the set-top box based on the transmitted access information.

2. The method of claim 1, wherein the receiving of the access information comprises:
    receiving first information of the digital content file, from the first device;
    based on the received first information, requesting the first device to provide the access information on the digital content file in a request; and
    receiving from the first device the access information in response to the request.

3. The method of claim 2, wherein the receiving of the first information of the digital content file comprises receiving a remote use interface (RUI) comprising the first information on the digital content file.

4. The method of claim 2, wherein the first information on the digital content file comprises at least one of an electronic program guide (EPG) and video on demand (VOD) list information.

5. The method of claim 2, wherein the requesting of the access information comprises including the information for identifying the second device into a message requesting the access information, and transmitting the message to the first device.

6. The method of claim 5, wherein the information for identifying the second device comprises at least one of an address of the second device and a global unique identifier (GUID).

7. A method, performed by a first device in a network permitted to access a digital content file provided by a content server outside the network, for relaying a digital content file through the network, the method comprising:
    receiving from the content server, access information of the digital content file stored in the content server; and
    transmitting the access information of the digital content file stored in the content server, to a second device in the network,
    wherein the access information of the digital content file includes location of the digital content file and information on an encryption key for decrypting the digital content file,
    wherein the access information transmitted by the first device enables the second device to directly receive the digital content file from the content server and reproduce the received digital content file,
    wherein the receiving access information of the digital content file further comprises transmitting information for identifying the second device to the content server,
    wherein the first device comprises a set-top box and the second device comprises a television within the home network, and
    wherein the television is configured to receive the digital content file directly from the content server and not from the set-top box based on the transmitted access information.

8. The method of claim 7, wherein the transmitting of the access information of the digital content file comprises:
    transmitting first information of the digital content file, to the second device;
    receiving a request by the second device to transmit the access information of the digital content file, based on the transmitted first information; and
    transmitting the access information to the second device in response to the request.

9. The method of claim 8, wherein the transmitting of the received first information on the digital content file comprises transmitting a remote user interface (RUI) including the first information on the digital content file.

10. The method of claim 8, wherein the receiving of the request for the access information comprises:
receiving from the second device a message requesting the access information including the information for identifying the second device; and
transmitting the received information for identifying the second device to the content server.

11. An apparatus of a second device in a network for receiving a digital content file from a content server outside the network, the apparatus comprising:
a receiving device configured to receive access information of the digital content file stored in the content server from a first device in the network; and
a transmitter configured to transmit a request to the content server to request transmission of the digital content file, based on the access information,
wherein the second device is configured to directly receive the requested digital content file from the content server and reproduce the received digital content file based on the access information,
wherein the access information of the digital content file includes location of the digital content file and information on an encryption key for decrypting the digital content file,
wherein the second device is configured to transmit information for identifying the second device to the content server through the first device,
wherein the receiver and the transmitter are implemented in a hardware device,
wherein the first device comprises a set-top box and the second device comprises a television within the home network, and
wherein the television is configured to receive the digital content file directly from the content server and not from the set-top box based on the transmitted access information.

12. The apparatus of claim 11, wherein the receiver comprises:
a content information reception unit which receives first information of the digital content files provided by the content server, from the first device;
a request transmission unit which requests the first device to provide the access information of the digital content file based on the received first information in a request; and
an access information reception unit which receives from the second device the access information in response to the request.

13. The apparatus of claim 12, wherein the content information reception unit receives a remote user interface (RUI) comprising the first information on the digital content files.

14. The apparatus of claim 12, wherein the request transmission unit transmits the information for identifying the second device, the information is included in a message requesting the access information, and the message is transmitted to the first device.

15. The apparatus of claim 11, wherein the digital content is directly received without the digital content going through the first device.

16. The apparatus of claim 11, wherein the first device comprises a relaying device and the second device comprises a reproducing device, and the first device is configured to relay content from the content server to the second device, and the reproducing device is configured to receive the digital content file directly from the content server and not from the relaying device based on the transmitted access information.

17. An apparatus of a first device of a network permitted to access a digital content file provide by a content server outside the network, for relaying the digital content file through the network, the apparatus comprising:
a receiver configured to receive access information of the digital content file stored in the content server from the content server; and
a transmitting device configured to transmit the access information of the digital content file stored in the content server, to a second device on the network,
wherein the access information of the digital content file includes location of the digital content file and information on an encryption key for decrypting the digital content file,
wherein the access information transmitted by the first device enables the second device to directly receive the digital content file from the content server and reproduce the received digital content file,
wherein the first device is configured to transmit information for identifying the second device to the content server,
wherein the first device comprises a set-top box and the second device comprises a television within the home network, and
wherein the television is configured to receive the digital content file directly from the content server and not from the set-top box based on the transmitted access information.

18. The apparatus of claim 17, wherein the transmitter comprises:
a content information transmission unit which transmits first information of the digital content file to the second device;
a request reception unit which receives a request by the second device to transmit the access information of the digital content file, based on the transmitted first information; and
an access information transmission unit which transmits the access information to the second device in response to the request.

19. The apparatus of claim 18, wherein the content information transmission unit transmits a remote user interface (RUI) including the first information on the digital content file.

20. The apparatus of claim 18, wherein the request reception unit comprises:
a request message reception unit which receives from the second device a message requesting the access information comprising the information for identifying the second device; and
an identification information transmission unit which transmits the received information for identifying the second device, to the content server.

21. A non-transitory computer readable recording medium having embodied thereon a computer program for executing a method, performed by a second device in a network, for receiving a digital content file from a content server outside the network, the method comprising:
receiving access information of the digital content file stored in the content server from a first device in the network permitted to access the digital content file;

requesting the content server to transmit the digital content file, based on the access information received from the first device;

receiving the requested digital content file directly from the content server and reproducing the received digital content file based on the access information, wherein the access information of the digital content file includes location of the digital content file and information on an encryption key for decrypting the digital content file, and wherein the receiving access information of the digital content file comprises transmitting information for identifying the second device to the content server through the first device, wherein the first device comprises a set-top box and the second device comprises a television within the home network, and wherein the receiving the requested digital comprises the television receiving the digital content file directly from the content server and not from the set-top box based on the transmitted access information.

22. A non-transitory computer readable recording medium having embodied thereon a computer program for executing a method, performed by a first device of a network permitted to access a digital content file provided by a content server outside the network, for relaying a digital content file through the network:

receiving from the content server, access information of the digital content file stored in the content server; and transmitting the access information of the digital content file stored in the content server, to a second device in the network, wherein the access information of the digital content file includes location of the digital content file and information on an encryption key for decrypting the digital content file, wherein the access information transmitted by the first device enables the second device to directly receive the digital content file from the content server and reproduce the received digital content file, wherein the receiving access information of the digital content file comprises transmitting information for identifying the second device to the content server, wherein the first device comprises a set-top box and the second device comprises a television within the home network, and wherein the television is configured to receive the digital content file directly from the content server and not from the set-top box based on the transmitted access information.

* * * * *